(12) United States Patent
Kao et al.

(10) Patent No.: US 9,482,328 B2
(45) Date of Patent: Nov. 1, 2016

(54) MULTI-MODE TRANSMISSION FOR VEHICLE POWERTRAIN SYSTEM

(71) Applicant: GM GLOBAL TECHNOLOGY OPERATIONS LLC, Detroit, MI (US)

(72) Inventors: Chi-Kuan Kao, Troy, MI (US); Chunhao J. Lee, Troy, MI (US); Kumaraswamy V. Hebbale, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 14/592,322

(22) Filed: Jan. 8, 2015

(65) Prior Publication Data

US 2016/0201779 A1   Jul. 14, 2016

(51) Int. Cl.
*F16H 37/02* (2006.01)
*F16H 1/46* (2006.01)

(52) U.S. Cl.
CPC .............. *F16H 37/022* (2013.01); *F16H 1/46* (2013.01); *F16H 2037/026* (2013.01); *F16H 2037/028* (2013.01)

(58) Field of Classification Search
None
See application file for complete search history.

(56) References Cited

U.S. PATENT DOCUMENTS

| 5,967,931 A * | 10/1999 | Hoge | B60K 17/348 180/247 |
| 7,637,836 B2 * | 12/2009 | Watanabe | B60K 6/365 475/209 |
| 2004/0033858 A1 * | 2/2004 | Sumi | F16H 37/086 475/214 |
| 2006/0025263 A1 | 2/2006 | Sowul et al. | |

* cited by examiner

*Primary Examiner* — Colby M Hansen
(74) *Attorney, Agent, or Firm* — Quinn Law Group, PLLC (57) ABSTRACT

A torque transmission device for a powertrain system is described, and includes a continuously variable unit (CVU) of a continuously variable transmission (CVT) arranged in parallel with a fixed-gear-ratio transmission to transfer torque between a transmission input member and a transmission output member. The fixed-gear-ratio transmission includes first and second planetary gear sets arranged to transfer torque between the transmission input member and the transmission output member in one of a plurality of fixed-gear-ratio modes by selectively activating a plurality of transmission clutches. The transmission input member rotatably couples to one of the nodes of the first planetary gear set and one of the nodes of the second planetary gear set. The torque transmission device transfers torque in one of a continuously variable mode, a fixed underdrive input/output speed ratio, or a fixed overdrive input/output speed ratio.

18 Claims, 9 Drawing Sheets

FIG. 17

MULTI-MODE TRANSMISSION FOR VEHICLE POWERTRAIN SYSTEM

TECHNICAL FIELD

This disclosure relates to a transmission for a vehicle powertrain, and a method and control system associated therewith.

BACKGROUND

Powertrains having an internal combustion engine coupled to a continuously or infinitely variable transmission (CVT) may be employed to provide tractive effort in vehicles. A characteristic of a CVT includes the capability to continuously change a speed ratio between a minimum input speed/output speed (overdrive) ratio and a maximum input speed/output speed (underdrive) ratio, thus permitting selection of engine operating points that achieve peak efficiency, e.g., a mean-best torque point that is responsive to an operator torque request. As such, a continuously variable transmission is capable of steplessly changing through an infinite number of effective gear ratios over a range between a maximum gear ratio and a minimum gear ratio.

Known belt-type continuously variable transmissions include two pulleys, each having two sheaves. A continuous torque-transfer device, e.g., a belt runs between the two pulleys, with the two sheaves of each of the pulleys sandwiching the belt therebetween. Frictional engagement between the sheaves of each pulley and the belt couples the belt to each of the pulleys to transfer torque from one pulley to the other. One of the pulleys may function as a drive or input pulley so that the other pulley (an output or driven pulley) can be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

Known toroidal continuously variable transmissions include discs and roller mechanisms that transmit power between the discs. The toroidal continuously variable transmission includes at least one input disc rotatably coupled to a torque generator, e.g., an internal combustion engine, and at least one output disc rotatably coupled to the transmission output. The input disc and output disc define a cavity therebetween. The cavity defines a toroidal surface. The roller mechanism is placed within the cavity and is configured to vary the torque transmission ratio as the roller mechanism moves across the toroidal surface. A controlled tilt of the roller mechanism within the cavity changes the relative diameter of engagement of the input disc and output disc and incrementally changes the torque transmission ratio, providing for smooth, nearly instantaneous changes in torque transmission ratio.

SUMMARY

A torque transmission device for a powertrain system is described, and includes a continuously variable unit (CVU) arranged in parallel with a fixed-gear-ratio transmission to transfer torque between a transmission input member and a transmission output member. The transmission input member selectively rotatably couples to an input member of the CVU variator by activating a CVU input clutch. The transmission output member rotatably couples to a CVU output member. The fixed-gear-ratio transmission includes first and second planetary gear sets arranged to transfer torque between the transmission input member and the transmission output member in one of a plurality of fixed-gear-ratio modes by selectively activating a plurality of transmission clutches. The first and second planetary gear sets each includes a plurality of meshingly engaged gear members including a ring gear, a plurality of planet gears coupled to a carrier and a sun gear, wherein each of the gear members represents a node. The transmission input member fixedly rotatably couples to one of the nodes of the first planetary gear set and selectively rotatably couples to one of the nodes of the second planetary gear set. The transmission output member rotatably couples to another of the nodes of the second planetary gear set. The torque transmission device transfers torque in a continuously variable mode when the CVU input clutch and a single one of the plurality of transmission clutches are activated. The torque transmission device transfers torque in a first of the fixed-gear-ratio modes including a fixed underdrive input/output speed ratio when the CVU input clutch is deactivated and a first set of two of the transmission clutches is activated. The torque transmission device transfers torque in a second of the fixed-gear-ratio modes including a fixed overdrive input/output speed ratio when the CVU input clutch is deactivated and a second set of two of the transmission clutches is activated.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
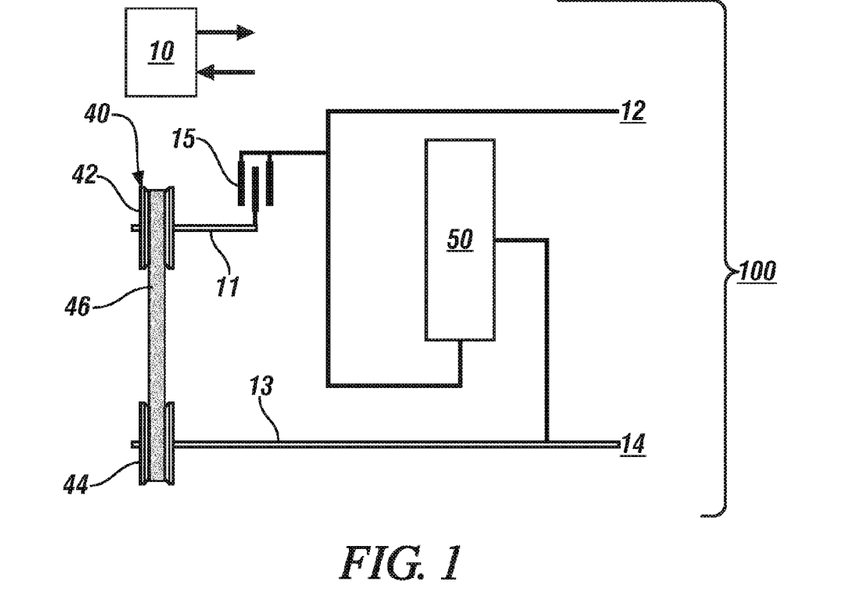
FIG. 1 schematically illustrates a multi-mode torque transmission device including a continuously variable unit (CVU) arranged to rotate in parallel with a fixed-gear-ratio transmission to transfer torque between an input member and an output member either a continuously variable state or a fixed-gear-ratio state, in accordance with the disclosure.

Referring now to the drawings, wherein the depictions are for the purpose of illustrating certain exemplary embodiments only and not for the purpose of limiting the same, FIG. 1 schematically illustrates elements of a powertrain system that includes a multi-mode torque transmission device (multi-mode transmission) 100 employing a non-limiting embodiment of a continuously variable unit (CVU) 40 of a continuously or infinitely variable transmission (CVT) arranged to rotate in parallel with an embodiment of a fixed-gear-ratio transmission 50 to transfer mechanical power in the form of torque and rotating speed between a transmission input member 12 and a transmission output member 14. The CVU 40 may also be referred to as a variator. Operation of various controllable elements of the multi-mode transmission 100 is controlled by a controller 10. The fixed-gear-ratio transmission 50 is capable of transferring mechanical power in either of an overdrive (OD) state and an underdrive (UD) state. Each of the embodiments of the multi-mode transmission 100 described herein is 'multi-mode' in that it is capable of transferring torque between the input member 12 and the output member 14 in either a continuously variable mode through the CVU 40 or a fixed-gear-ratio mode through the fixed-gear-ratio transmission 50. In one embodiment, the input member 12 couples to a torque-generative device or prime mover such as an internal combustion engine or an electric machine. In one embodiment, the output member 14 couples to a driveline to transfer torque to tractive wheels. The controller 10 monitors operation and controls various actuators to effect operation in the continuously variable mode through the CVU 40 and effect operation in a fixed-gear-ratio mode in the fixed-gear-ratio transmission 50. Like numerals and like terms refer to like elements throughout the description.

The transmission input member 12 selectively rotatably couples to a CVU input member 11 of the CVU variator 40 by activating a CVU input clutch 15. The transmission output member 14 rotatably couples to a CVU output member 13 of the CVU variator 40. The fixed-gear-ratio transmission 50 preferably includes first and second planetary gear sets that are arranged to transfer torque between the transmission input member 12 and the transmission output member 14 by selectively activating a plurality of transmission clutches. The first and second planetary gear sets and transmission clutches are described with reference to FIGS. 2 through 19. As used herein, the term "selectively" is employed to describe any controller-controllable operating state, including activation and deactivation of one or a plurality of clutches. A "clutch" can be any selectively activatable and deactivatable torque transfer device that employs friction, mechanical interference or another suitable force to couple devices, including rotatably coupling coaxial devices. A "brake" is a form of a clutch that includes any selectively activatable and deactivatable torque transfer device that employs friction, mechanical interference or another suitable force to ground rotation of a rotatable device to a transmission case or other non-rotating element. Thus, the term "clutch" is employed herein to describe coupling two coaxial rotating devices and to describe coupling a rotating device to a non-rotating element.

As described herein, the multi-mode transmission 100 operates to transfer torque between the input member 12 and the output member 14 through the CVU variator 40 in a continuously variable mode when the CVU input clutch 15 is activated. As described herein, the multi-mode transmission 100 operates to transfer torque between the input member 12 and the output member 14 through the fixed-gear-ratio transmission 50 in a first fixed-gear-ratio mode at a fixed UD input/output speed ratio or in a second fixed-gear-ratio mode at a fixed OD input/output speed ratio when the CVU input clutch 15 is deactivated when other specific conditions described herein are met.

The CVU 40 as illustrated employs a belt-driven variator that includes a first pulley 42 rotatably coupled to a second pulley 44 via a belt 46. The first pulley 42 rotatably couples to the CVU input member 11 and the second pulley 44 rotatably couples to the CVU output member 13. Other elements of the CVU 40 and operation thereof are known and not described in detail herein. Alternatively, the CVU 40 may employ a toroidal variator, or another suitable variator configuration. Belt-driven variators and toroidal variators are known and not described in detail herein.

Controller 10 controls each embodiment of the powertrain system described herein. The controller 10 monitors sensor inputs and executes control routines to determine control parameters for actuators to control operation of various powertrain elements. Driver input devices such as an accelerator pedal and associated accelerator pedal position sensor can be monitored to determine an operator torque request. Various sensors are suitably positioned for sensing and providing signals, including, e.g., an input speed sensor monitoring rotation of the transmission input member 12, variator speed sensor(s) monitoring the CVU variator 40 and an output speed sensor monitoring rotation of the transmission output member 14. The input speed sensor and output speed sensor may be any suitable rotation position/speed sensing device, such as a Hall-effect sensor. The controller 10 may include digital processing capability that issues control signals based on input signals such as vehicle speed and engine torque. The controller 10 and similar terms control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds. Communications between controllers and between controllers, actuators and/or sensors may be accomplished using a direct wired link, a networked communications bus link, a wireless link or any another suitable communications link.

Each of the embodiments of the fixed-gear-ratio transmission described herein with reference to FIGS. 2 through 16 includes first and second planetary gear sets arranged to transfer torque between the transmission input member 12 and the transmission output member 14 by selectively activating a plurality of transmission clutches and/or transmission brakes. Each of the embodiments of the first and second planetary gear sets is preferably a simple differential gearset that includes a plurality of meshingly engaged gear members including a ring gear, and a plurality of planet gears coupled to a carrier and a sun gear. Each of the aforementioned gear members (ring gear, carrier, and sun gear) represents a node. Furthermore, the transmission input member 12 rotatably couples to one of the nodes of the first planetary gear set and/or one of the nodes of the second planetary gear set, and the transmission output member 14 rotatably couples to another of the nodes of the first or the second planetary gear set. The multi-mode transmission 100 transfers torque in a continuously variable mode when the CVU input clutch 15 and a single one of a plurality of transmission clutches are activated. The multi-mode transmission 100 transfers mechanical power in the form of torque and rotational speed between the transmission input member 12 and the transmission output member 14 in a first fixed-gear-ratio mode when the CVU input clutch 15 is deactivated and a first set of two of transmission clutches is activated. The multi-mode transmission 100 transfers mechanical power in the form of torque and rotational speed between the input member 12 and the output member 14 in a second, different fixed-gear-ratio mode when the CVU input clutch 15 is deactivated and a second set of two of the transmission clutches is activated. The first and second sets of the activated transmission clutches are identified for each of the embodiments of the fixed-gear-ratio transmission described with reference to FIGS. 2-17. Furthermore, one of the nodes of the first planetary gear set rotatably couples to one of the nodes of the second planetary gear when the multi-mode transmission 100 is operating at the first fixed underdrive input/output speed ratio and when the multi-mode transmission 100 is operating at the second fixed overdrive input/output speed ratio. Operation in a reverse mode is achieved in a fixed input/output speed ratio when the CVU input clutch is deactivated and a third set of two of the transmission clutches is activated, as described herein.

Figure 2:
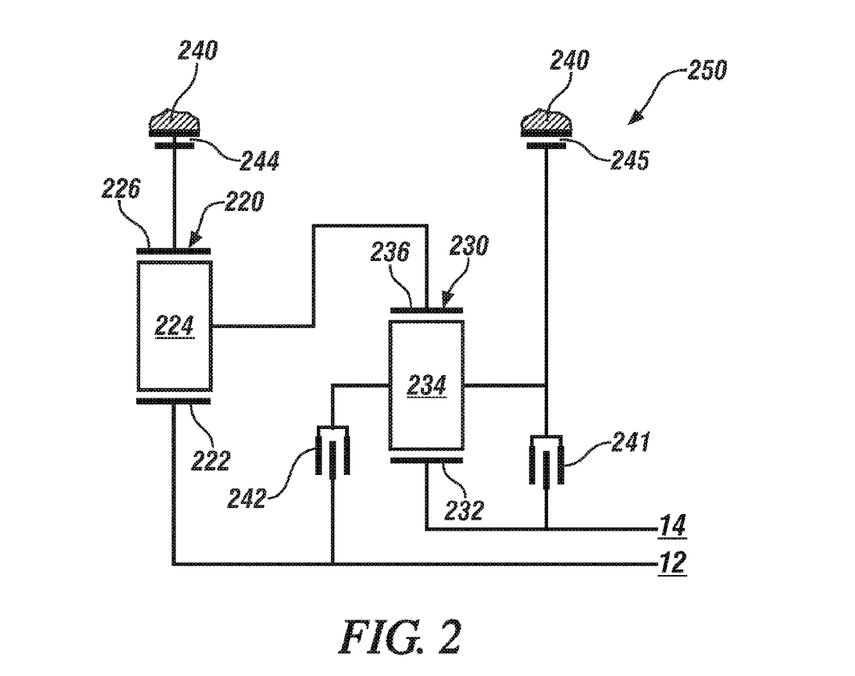
FIGS. 2-17 schematically illustrate embodiments of fixed-gear-ratio transmissions arranged to rotate in parallel with an embodiment of CVU described with reference to FIG. 1, in accordance with the disclosure.

FIG. 2 schematically illustrates a first embodiment of the fixed-gear-ratio transmission 50 that is capable of transferring mechanical power in either of an overdrive (OD) state and an underdrive (UD) state between the transmission input member 12 and the transmission output member 14. In this embodiment, the fixed-gear-ratio transmission 50 includes a first planetary gear set 220 and a second planetary gear set 230. The first and second planetary gear sets 220, 230 are simple planetary gear sets. The first planetary gear set 220 includes a first sun gear 222, a first carrier 224 and a first ring gear 226, and the second planetary gear set 230 includes a second sun gear 232, a second carrier 234 and a second ring gear 236. The input member 12 couples to the first sun gear 222 and selectively couples to the second carrier 234 by activating a second clutch C2 242. The first carrier 224 couples to the second ring gear 236, and the first ring gear 226 selectively couples to the transmission case 240 by activating a first brake B1 244. The second carrier 234 selectively grounds to the transmission case 240 by activating a second brake B2 245 and selectively couples to the output member 14 and second sun gear 232 by activating a first clutch C1 241. In one embodiment, the first brake B1 244 may be omitted and replaced by permanently coupling the first ring gear 226 to the transmission case 240. In an embodiment of the multi-mode transmission 100 employing this embodiment of the fixed-gear-ratio transmission 250, a clutch activation chart and corresponding gear ratios associated with operation thereof is detailed in Table 1, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows. In each of the tables, an "X" in the box indicates that the particular clutch or brake is activated to effect operation in the associated mode, and an "(X)" indicates that the particular clutch or brake may or may not be activated to effect operation in the associated mode.

TABLE 1

| | Ratios | B1 | B2 | C1 | C2 | Ccvt |
|---|---|---|---|---|---|---|
| Reverse | −2.57 | X | X | | | |
| Neutral | 0 | (X) | | | | |
| 1 | 3.6 | X | | X | | |
| CVTUD | 2 | X | | | | X |
| CVTOD | 0.5 | X | | | | X |
| 3 | 0.5 | X | | | X | |

Figure 3:
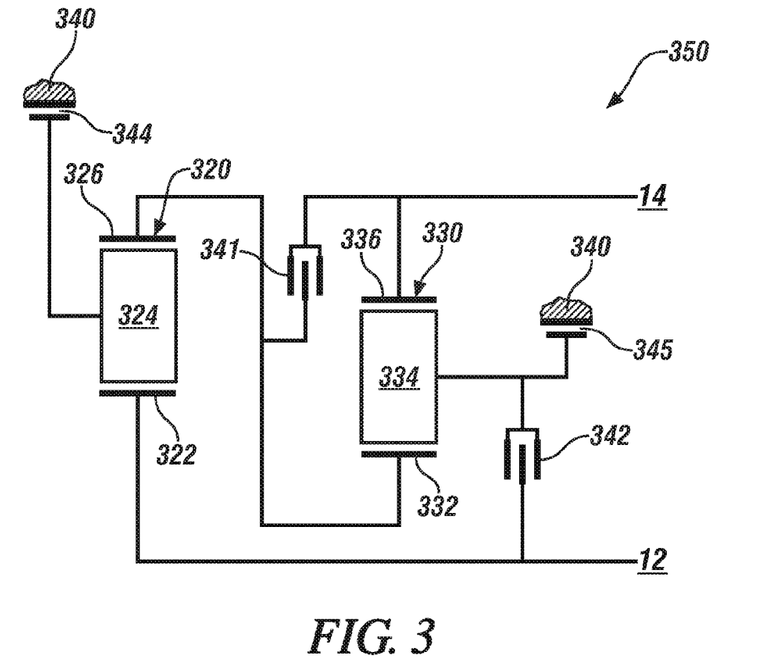
Figure 17:
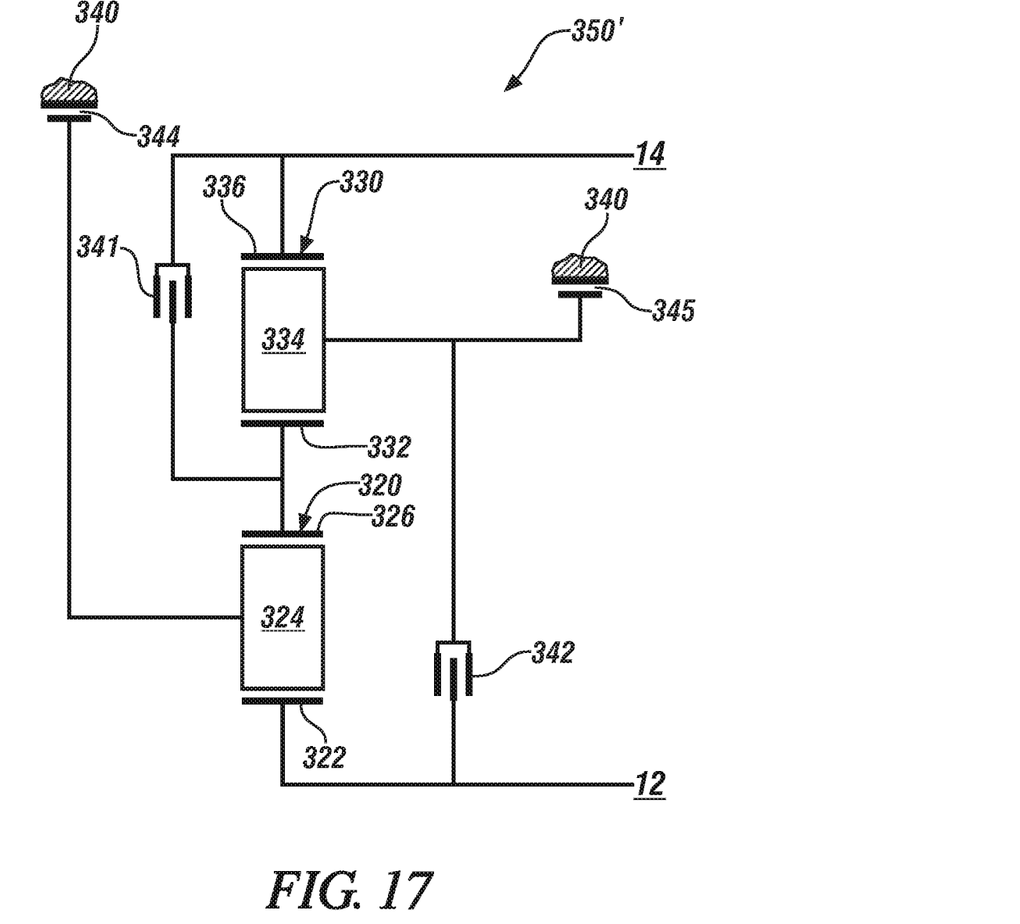

FIG. 3 schematically illustrates another embodiment of the fixed-gear-ratio transmission 350 that is capable of transferring mechanical power in either of an overdrive (OD) state and an underdrive (UD) state between the transmission input member 12 and the transmission output member 14. In this embodiment, the fixed-gear-ratio transmission 350 includes a first planetary gear set 320 and a second planetary gear set 330. In one embodiment, the first and second planetary gear sets 320, 330 are simple planetary gear sets. FIG. 17 schematically illustrates this embodiment of the fixed-gear-ratio transmission 350' with the first and second planetary gear sets 320, 330 in a stacked configuration. The first planetary gear set 320 includes a first sun gear 322, a first carrier 324 and a first ring gear 326, and the second planetary gear set 330 includes a second sun gear 332, a second carrier 334 and a second ring gear 336. The input member 12 couples to the first sun gear 322 and selectively couples to the second carrier 334 by activating a second clutch C2 342. The first carrier 324 selectively grounds to the transmission case 340 by activating a first brake 344. In one embodiment, the first brake B1 344 may be omitted and replaced by permanently coupling the first carrier 324 to the transmission case 340. The first ring gear 326 couples to the second sun gear 332 and selectively couples to the second ring gear 336 and the output member 14 by activating first clutch 341. The second carrier 334 also selectively grounds to the transmission case 340 by activating second brake 345. In an embodiment of the multi-mode transmission 100 employing this embodiment of the fixed-gear-ratio transmission 350, 350', a clutch activation chart and corresponding gear ratios associated with operation thereof is detailed in Table 2, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 2

| | Ratios | B1 | B2 | C1 | C2 | Ccvt |
|---|---|---|---|---|---|---|
| Reverse | −2.6 | X | | | X | |
| Neutral | 0 | (X) | | | | |
| 1 | 3.64 | X | X | | | |
| CVTUD | 2 | X | | | | X |
| CVTOD | 0.5 | X | | | | X |
| 3 | 0.5 | X | | X | | |

Figure 4:
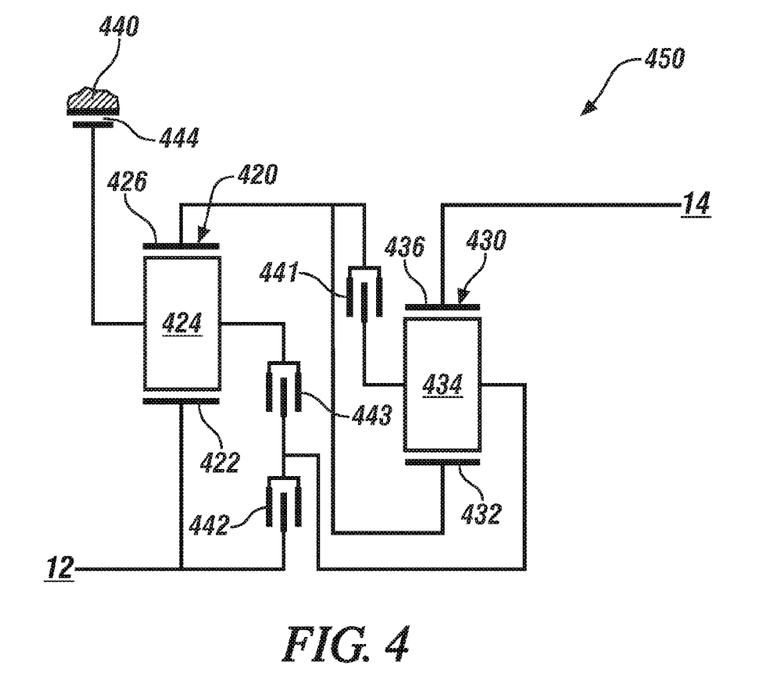

FIG. 4 schematically illustrates another embodiment of the fixed-gear-ratio transmission 450 that is capable of transferring mechanical power in either of an overdrive (OD) state and an underdrive (UD) state between the transmission input member 12 and the transmission output member 14. In this embodiment, the fixed-gear-ratio transmission 450 includes a first planetary gear set 420 and a second planetary gear set 430. In one embodiment, the first and second planetary gear sets 420, 430 are simple planetary gear sets. In one embodiment, the first and second planetary gear sets 420, 430 can be stacked. The first planetary gear set 420 includes a first sun gear 422, a first carrier 424 and a first ring gear 426, and the second planetary gear set 430 includes a second sun gear 432, a second carrier 434 and a second ring gear 436. The input member 12 couples to the first sun gear 422, selectively couples to the first carrier 424 by activating a second clutch C2 442 and a third clutch C3 443, and selectively couples to the second carrier 434 by activating the second clutch C2 442. The first carrier 424 selectively grounds to the transmission case 440 by activating a first brake B1 444. The first ring gear 426 couples to the second sun gear 432 and selectively couples to the second carrier 434 by activating a first clutch C1 441. The second ring gear 436 couples to the output member 14. In one embodiment, the first brake B1 444 may be omitted and replaced by permanently coupling the first ring gear 426 to the transmission case 440. In an embodiment of the multi-mode transmission 100 employing this embodiment of the fixed-gear-ratio transmission 450, a clutch activation chart and corresponding gear ratios associated with operation thereof is detailed in Table 3, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 3

| | Ratios | B1 | C1 | C2 | C3 | Ccvt |
|---|---|---|---|---|---|---|
| Reverse | −2.6 | X | X | | | |
| Neutral | 0 | (X) | | | | |
| 1 | 3.64 | X | | | X | |
| CVTUD | 2 | X | | | | X |
| CVTOD | 0.5 | X | | | | X |
| 3 | 0.5 | X | | X | | |

Figure 5:
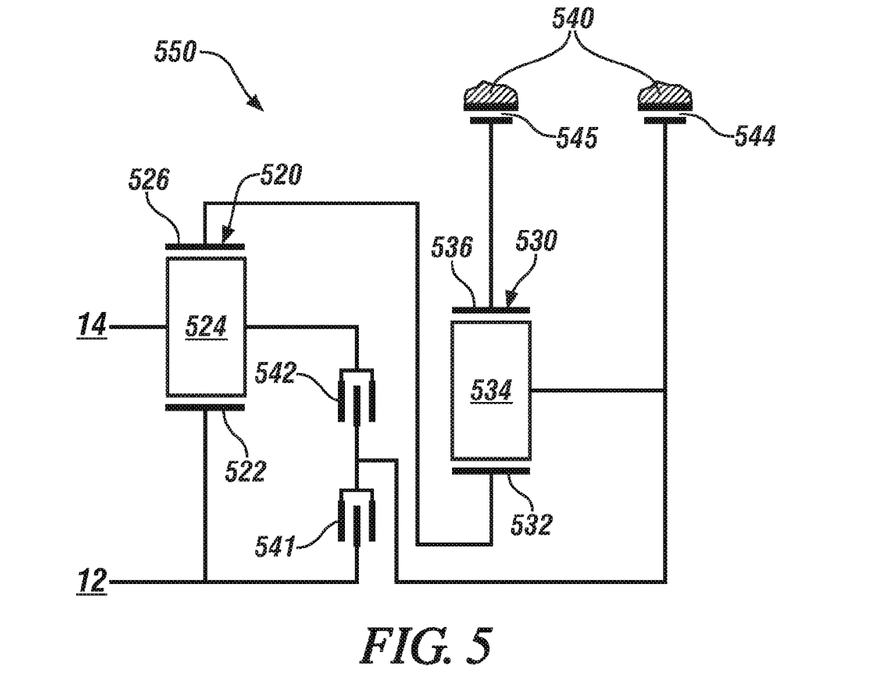

FIG. 5 schematically illustrates another embodiment of the fixed-gear-ratio transmission 550 that is capable of transferring mechanical power in either of an overdrive (OD) state and an underdrive (UD) state between the transmission input member 12 and the transmission output member 14. In this embodiment, the fixed-gear-ratio transmission 550 includes a first planetary gear set 520 and a second planetary gear set 530. In one embodiment, the first and second planetary gear sets 520, 530 are simple planetary gear sets. In one embodiment, the first and second planetary gear sets 520, 530 can be stacked. The first planetary gear set 520 includes a first sun gear 522, a first carrier 524 and a first ring gear 526, and the second planetary gear set 530 includes a second sun gear 532, a second carrier 534 and a second ring gear 536. The input member 12 couples to the first sun gear 522, selectively couples to the first carrier 524 by activating a first clutch C1 541 and a second clutch C2 542, and selectively couples to the second carrier 534 by activating the first clutch C1 541. The first carrier 524 couples to the output member 14 and selectively couples to the second carrier 534 by activating the second clutch C2 542. The first ring gear 526 couples to the second sun gear 532. The second carrier 534 selectively grounds to the transmission case 540 by activating a first brake B1 544. The second ring gear 536 selectively grounds to the transmission case 540 by activating a second brake B2 545. In one embodiment, the second brake B2 545 may be omitted and replaced by permanently coupling the first ring gear 526 to the transmission case 540. In an embodiment of the multi-mode transmission 100 employing this embodiment of the fixed-gear-ratio transmission 550, a clutch activation chart and corresponding gear ratios associated with operation thereof is detailed in Table 4, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 4

| | Ratios | B1 | B2 | C1 | C2 | Ccvt |
|---|---|---|---|---|---|---|
| Reverse | −2.64 | | X | | X | |
| Neutral | 0 | | (X) | | | |
| 1 | 3.6 | X | X | | | |
| CVTUD | 2 | | X | | | X |
| CVTOD | 0.5 | | X | | | X |
| 3 | 0.5 | | X | X | | |

Figure 6:
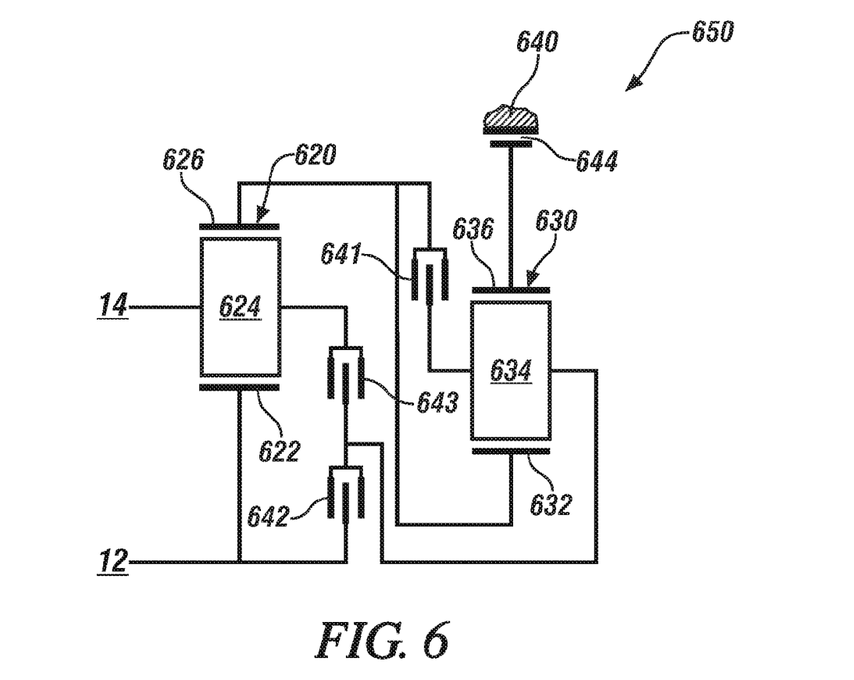

FIG. 6 schematically illustrates another embodiment of the fixed-gear-ratio transmission 650 that is capable of transferring mechanical power in either of an overdrive (OD) state and an underdrive (UD) state between the transmission input member 12 and the transmission output member 14. In this embodiment, the fixed-gear-ratio transmission 650 includes a first planetary gear set 620 and a second planetary gear set 630. In one embodiment, the first and second planetary gear sets 620, 630 are simple planetary gear sets. In one embodiment, the first and second planetary gear sets 620, 630 can be stacked. The first planetary gear set 620 includes a first sun gear 622, a first carrier 624 and a first ring gear 626, and the second planetary gear set 630 includes a second sun gear 632, a second carrier 634 and a second ring gear 636. The input member 12 couples to the first sun gear 622, selectively couples to the first carrier 624 by activating a second clutch C2 642 and a third clutch C3 643, and selectively couples to the second carrier 634 by activating second clutch C2 642. The first carrier 624 also couples to output member 14 and selectively couples to the second carrier 634 by activating the third clutch C3 643. The first ring gear 626 couples to the second sun gear 632, and selectively couples to the second carrier 634 by activating a first clutch C1 641. The second ring gear 636 selectively couples to the transmission case 640 by activating a first brake B1 644. In one embodiment, the first brake B1 644 may be omitted and replaced by permanently coupling the second ring gear 636 to the transmission case 640. In an embodiment of the multi-mode transmission 100 employing this embodiment of the fixed-gear-ratio transmission 650, a clutch activation chart and corresponding gear ratios associated with operation thereof is detailed in Table 5, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 5

| | Ratios | B1 | C1 | C2 | C3 | Ccvt |
|---|---|---|---|---|---|---|
| Reverse | −2.64 | X | | | X | |
| Neutral | 0 | (X) | | | | |
| 1 | 3.6 | X | X | | | |
| CVTUD | 2 | X | | | | X |
| CVTOD | 0.5 | X | | | | X |
| 3 | 0.5 | X | | | X | |

Figure 7:
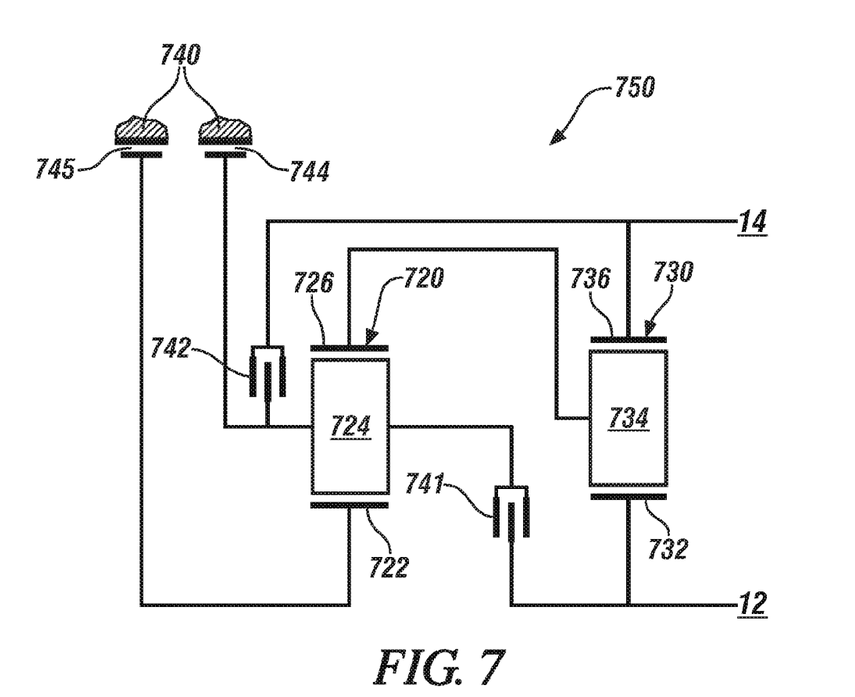

FIG. 7 schematically illustrates another embodiment of the fixed-gear-ratio transmission 750 that is capable of transferring mechanical power in either of an overdrive (OD) state and an underdrive (UD) state between the transmission input member 12 and the transmission output member 14. In this embodiment, the fixed-gear-ratio transmission 750 includes a first planetary gear set 720 and a second planetary gear set 730. In one embodiment, the first and second planetary gear sets 720, 730 are simple planetary gear sets. The first planetary gear set 720 includes a first sun gear 722, a first carrier 724 and a first ring gear 726, and the second planetary gear set 730 includes a second sun gear 732, a second carrier 734 and a second ring gear 736. The input member 12 couples to the second sun gear 732 and selectively couples to the first carrier 724 by activating a first clutch C1 741. The second carrier 734 couples to the first ring gear 726, and the second ring gear 736 couples to the output member 14. The first sun gear 722 selectively grounds to the transmission case 740 by activating a second brake B2 745. The first carrier 724 selectively grounds to the transmission case 740 by activating a first brake B1 744 and selectively couples to the output member 14 and the second ring gear 736 by activating a second clutch C2 742. In one embodiment, the second brake B2 745 may be omitted and replaced by permanently coupling the first sun gear 722 to the transmission case 740. In an embodiment of the multi-mode transmission 100 employing this embodiment of the fixed-gear-ratio transmission 750, a clutch activation chart and corresponding gear ratios associated with operation thereof is detailed in Table 6, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 6

| | Ratios | B1 | B2 | C1 | C2 | Ccvt |
|---|---|---|---|---|---|---|
| Reverse | −2.6 | X | X | | | |
| Neutral | 0 | | (X) | | | |
| 1 | 3.57 | | X | X | | |
| CVTUD | 2 | | X | | | X |
| CVTOD | 0.5 | | X | | | X |
| 3 | 0.5 | | X | | X | |

Figure 8:
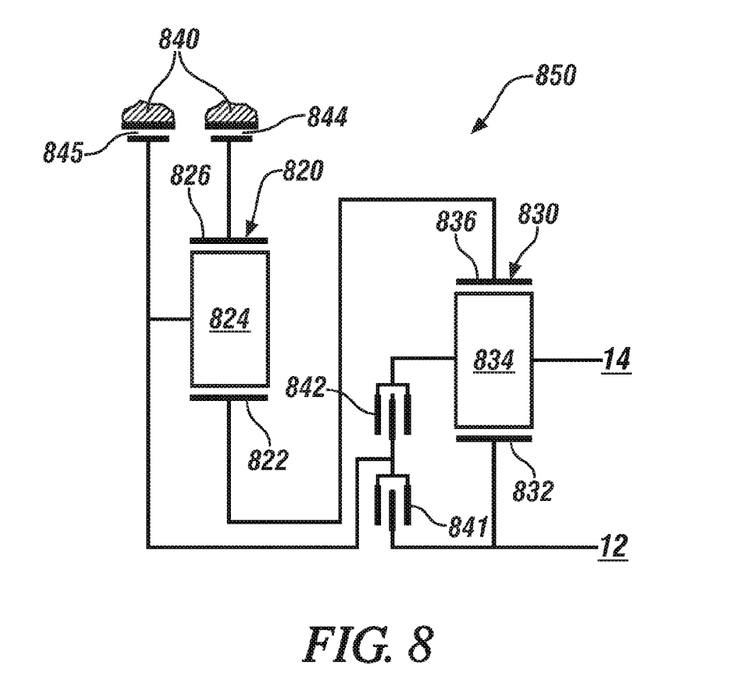

FIG. 8 schematically illustrates another embodiment of the fixed-gear-ratio transmission 850 that is capable of transferring mechanical power in either of an overdrive (OD) state and an underdrive (UD) state between the transmission input member 12 and the transmission output member 14. In this embodiment, the fixed-gear-ratio transmission 850 includes a first planetary gear set 820 and a second planetary gear set 830. In one embodiment, the first and second planetary gear sets 820, 830 are simple planetary gear sets. In one embodiment, the first and second planetary gear sets 820, 830 can be stacked. The first planetary gear set 820 includes a first sun gear 822, a first carrier 824 and a first ring gear 826, and the second planetary gear set 830 includes a second sun gear 832, a second carrier 834 and a second ring gear 836. The input member 12 couples to the second sun gear 832, and selectively couples to the second carrier 834 by activating a first clutch C1 841 and a second clutch C2 842. The second carrier 834 couples to the output member 14. The second carrier 834 couples to the first carrier 824 by activating second clutch C2 842. The second ring gear 836 couples to the first sun gear 822. The first carrier 824 selectively grounds to the transmission case 840 by activating a second brake B2 845 and selectively couples to the second sun gear 832 by activating the first clutch C1 841. The first ring gear 826 selectively grounds to the transmission case 840 by activating a first brake B1 844. In one embodiment, the first brake B1 844 may be omitted and replaced by permanently coupling the first ring gear 826 to the transmission case 840. In an embodiment of the multi-mode transmission 100 employing this embodiment of the fixed-gear-ratio transmission 850, a clutch activation chart and corresponding gear ratios associated with operation thereof is detailed in Table 7, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 7

| | Ratios | B1 | B2 | C1 | C2 | Ccvt |
|---|---|---|---|---|---|---|
| Reverse | −2.64 | X | | | X | |
| Neutral | 0 | (X) | | | | |
| 1 | 3.6 | X | X | | | |
| CVTUD | 2 | X | | | | X |
| CVTOD | 0.5 | X | | | | X |
| 3 | 0.5 | X | | X | | |

Figure 9:
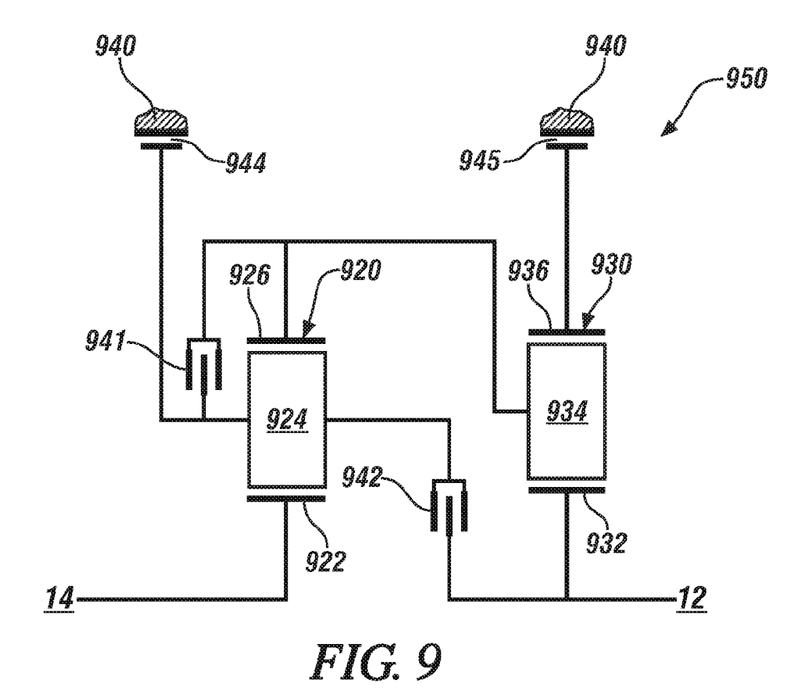

FIG. 9 schematically illustrates another embodiment of the fixed-gear-ratio transmission 950 that is capable of transferring mechanical power in either of an overdrive (OD) state and an underdrive (UD) state between the transmission input member 12 and the transmission output member 14. In this embodiment, the fixed-gear-ratio transmission 950 includes a first planetary gear set 920 and a second planetary gear set 930. In one embodiment, the first and second planetary gear sets 920, 930 are simple planetary gear sets. The first planetary gear set 920 includes a first sun gear 922, a first carrier 924 and a first ring gear 926, and the second planetary gear set 930 includes a second sun gear 932, a second carrier 934 and a second ring gear 936. The input member 12 couples to the second sun gear 932 and selectively couples to the first carrier 924 by activating a second clutch C2 942. The second carrier 934 couples to the first ring gear 926. The second ring gear 936 selectively grounds to the transmission case 940 by activating a second brake B2 945. The first sun gear 922 couples to the output member 14. The first carrier 924 selectively grounds to the transmission case 940 by activating a first brake B1 944, and selectively couples to the first ring gear 926 and the second carrier 934 by activating first clutch C1 941. In one embodiment, the second brake B2 945 may be omitted and replaced by permanently coupling the second ring gear 936 to the transmission case 940. In an embodiment of the multi-mode transmission 100 employing this embodiment of the fixed-gear-ratio transmission 950, a clutch activation chart and corresponding gear ratios associated with operation thereof is detailed in Table 8, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 8

| | Ratios | B1 | B2 | C1 | C2 | Ccvt |
|---|---|---|---|---|---|---|
| Reverse | −2.57 | X | X | | | |
| Neutral | 0 | | (X) | | | |
| 1 | 3.6 | | X | X | | |
| CVTUD | 2 | | X | | | X |
| CVTOD | 0.5 | | X | | | X |
| 3 | 0.5 | | X | | X | |

Figure 10:
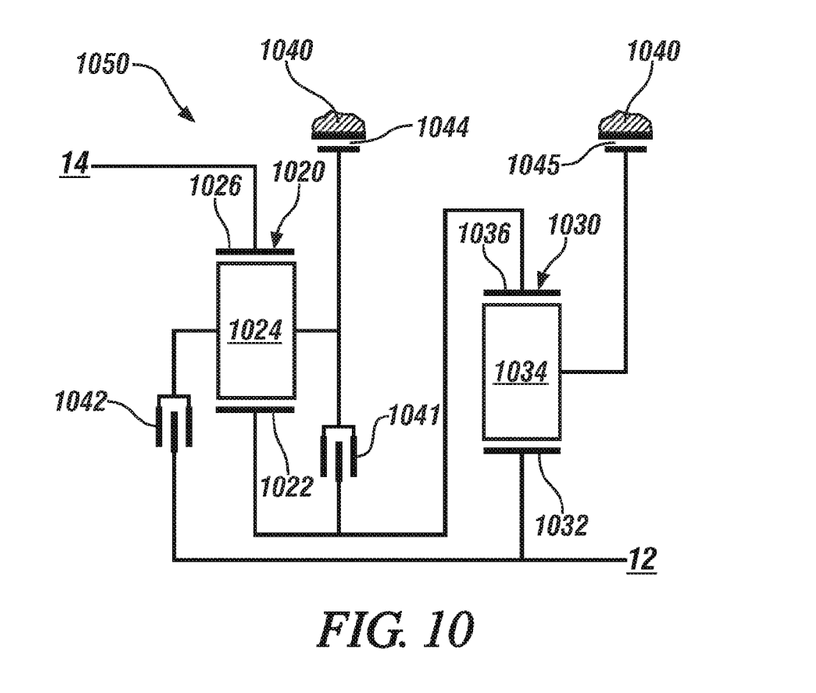

FIG. 10 schematically illustrates another embodiment of the fixed-gear-ratio transmission 1050 that is capable of transferring mechanical power in either of an overdrive (OD) state and an underdrive (UD) state between the transmission input member 12 and the transmission output member 14. In this embodiment, the fixed-gear-ratio transmission 1050 includes a first planetary gear set 1020 and a second planetary gear set 1030. In one embodiment, the first and second planetary gear sets 1020, 1030 are simple planetary gear sets. In one embodiment, the first and second planetary gear sets 1020, 1030 can be stacked. The first planetary gear set 1020 includes a first sun gear 1022, a first carrier 1024 and a first ring gear 1026, and the second planetary gear set 1030 includes a second sun gear 1032, a second carrier 1034 and a second ring gear 1036. The input member 12 couples to the second sun gear 1032 and selectively couples to the first carrier 1024 by activating a second clutch C2 1042. The second carrier 1034 selectively grounds to the transmission case 1040 by activating a second brake B2 1045. The second ring gear 1036 couples to the first sun gear 1022 and selectively couples to the first carrier 1024 by activating first clutch C1 1041. The first carrier 1024 couples to the second ring gear 1036 and selectively couples to the transmission case 1040 by activating a first brake B1 1044. The first ring gear 1026 couples to the output member 1020. In one embodiment, the second brake B2 1045 may be omitted and replaced by permanently coupling the second carrier 1034 to the transmission case 1040. In an embodiment of the multi-mode transmission 100 employing this embodiment of the fixed-gear-ratio transmission 1050, a clutch activation chart and corresponding gear ratios associated with operation thereof is detailed in Table 9, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 9

| | Ratios | B1 | B2 | C1 | C2 | Ccvt |
|---|---|---|---|---|---|---|
| Reverse | −2.6 | | X | X | | |
| Neutral | 0 | | (X) | | | |
| 1 | 3.64 | X | X | | | |
| CVTUD | 2 | | X | | | X |
| CVTOD | 0.5 | | X | | | X |
| 3 | 0.5 | | X | | X | |

Figure 11:
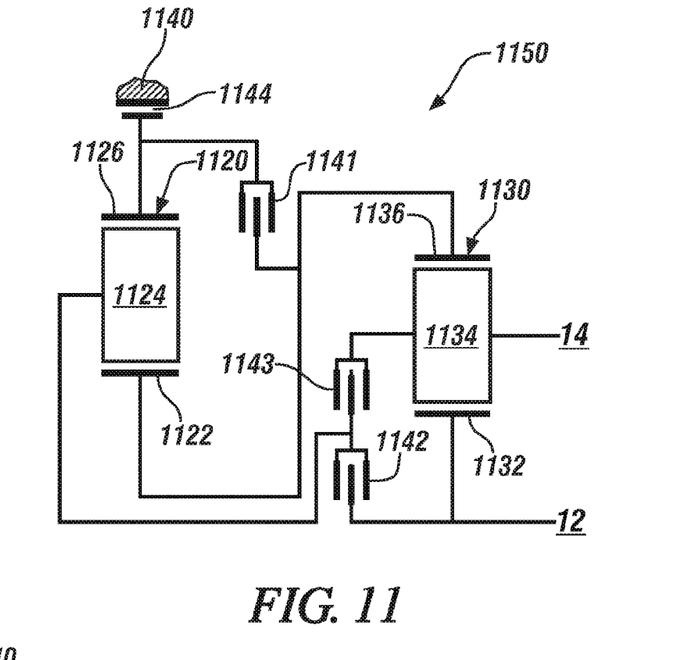

FIG. 11 schematically illustrates another embodiment of the fixed-gear-ratio transmission 1150 that is capable of transferring mechanical power in either of an overdrive (OD) state and an underdrive (UD) state between the transmission input member 12 and the transmission output member 14. In this embodiment, the fixed-gear-ratio transmission 1150 includes a first planetary gear set 1120 and a second planetary gear set 1130. In one embodiment, the first and second planetary gear sets 1120, 1130 are simple planetary gear sets. In one embodiment, the first and second planetary gear sets 1120, 1130 can be stacked. The first planetary gear set 1120 includes a first sun gear 1122, a first carrier 1124 and a first ring gear 1126, and the second planetary gear set 1130 includes a second sun gear 1132, a second carrier 1134 and a second ring gear 1136. The input member 12 couples to the second sun gear 1132, selectively couples to the first carrier 1124 by activating a second clutch C2 1142, and selectively couples to the second carrier 1134 by activating the second clutch C2 1142 and a third clutch C3 1143. The second carrier 1134 couples to the output member 14, and selectively couples to the first carrier 1124 by activating third clutch C3 1143. The second ring gear 1136 couples to the first sun gear 1122, selectively couples to the first ring gear 1126 by activating a first clutch C1 1141, and selectively grounds to the transmission case 1140 by activating the first clutch C1 1141 and a first brake B1 1144. The first ring gear 1126 selectively couples to the transmission case 1140 by activating the first brake B1 1144. In one embodiment, the first brake B1 1144 may be omitted and replaced by permanently coupling the first ring gear 1126 to the transmission case 1140. In an embodiment of the multi-mode transmission 100 employing this embodiment of the fixed-gear-ratio transmission 1150, a clutch activation chart and corresponding gear ratios associated with operation thereof is detailed in Table 10, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 10

| | Ratios | B1 | C1 | C2 | C3 | Ccvt |
|---|---|---|---|---|---|---|
| Reverse | −2.64 | X | | | X | |
| Neutral | 0 | (X) | | | | |
| 1 | 3.6 | X | X | | | |
| CVTUD | 2 | X | | | | X |
| CVTOD | 0.5 | X | | | | X |
| 3 | 0.5 | X | | | X | |

Figure 12:
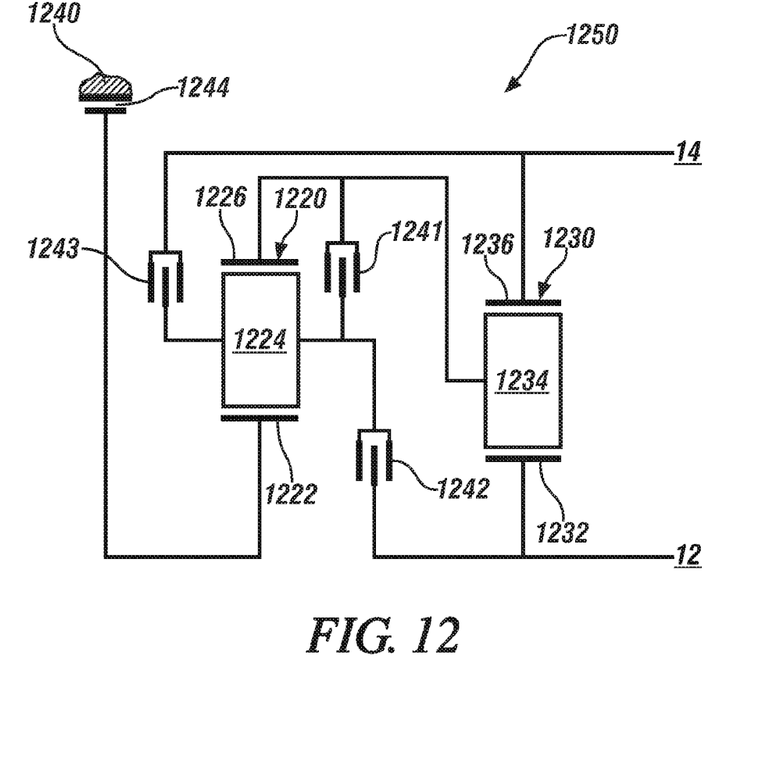

FIG. 12 schematically illustrates another embodiment of the fixed-gear-ratio transmission 1250 that is capable of transferring mechanical power in either of an overdrive (OD) state and an underdrive (UD) state between the transmission input member 12 and the transmission output member 14. In this embodiment, the fixed-gear-ratio transmission 1250 includes a first planetary gear set 1220 and a second planetary gear set 1230. In one embodiment, the first and second planetary gear sets 1220, 1230 are simple planetary gear sets. The first planetary gear set 1220 includes a first sun gear 1222, a first carrier 1224 and a first ring gear 1226, and the second planetary gear set 1230 includes a second sun gear 1232, a second carrier 1234 and a second ring gear 1236. The input member 12 couples to the second sun gear 1232 and selectively couples to the first carrier 1224 by activating a second clutch C2 1242. The second carrier 1234 couples to the first ring gear 1226 and selectively couples to the first carrier 1224 by activating a first clutch C1 1241. The second ring gear 1236 couples to the output member 14 and selectively couples to the first carrier 1224 by activating a third clutch C3 1243. The first sun gear 1222 selectively grounds to the transmission case 1240 by activating a first brake B1 1244. In one embodiment, the first brake B1 1244 may be omitted and replaced by permanently coupling the first sun gear 1222 to the transmission case 1240. In an embodiment of the multi-mode transmission 100 employing this embodiment of the fixed-gear-ratio transmission 1250, a clutch activation chart and corresponding gear ratios associated with operation thereof is detailed in Table 11, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 11

| | Ratios | B1 | C1 | C2 | C3 | Ccvt |
|---|---|---|---|---|---|---|
| Reverse | −2.6 | X | X | | | |
| Neutral | 0 | (X) | | | | |
| 1 | 3.57 | X | | | X | |
| CVTUD | 2 | X | | | | X |
| CVTOD | 0.5 | X | | | | X |
| 3 | 0.5 | X | | | X | |

Figure 13:
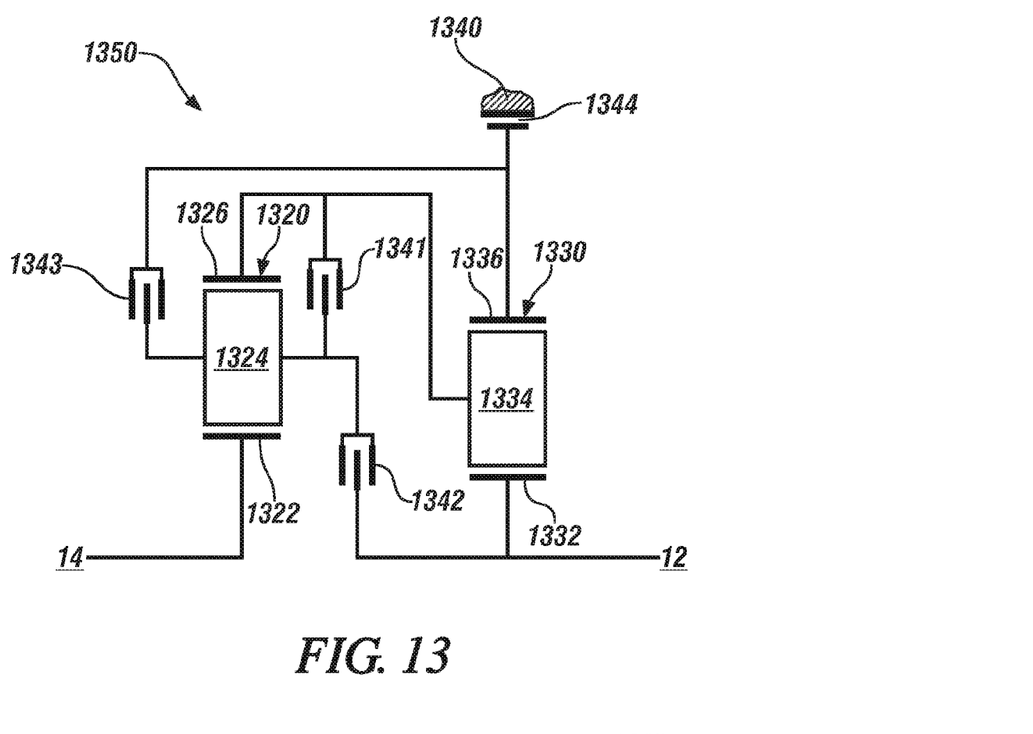

FIG. 13 schematically illustrates another embodiment of the fixed-gear-ratio transmission 1350 that is capable of transferring mechanical power in either of an overdrive (OD) state and an underdrive (UD) state between the transmission input member 12 and the transmission output member 14. In this embodiment, the fixed-gear-ratio transmission 1350 includes a first planetary gear set 1320 and a second planetary gear set 1330. In one embodiment, the first and second planetary gear sets 1320, 1330 are simple planetary gear sets. The first planetary gear set 1320 includes a first sun gear 1322, a first carrier 1324 and a first ring gear 1326, and the second planetary gear set 1330 includes a second sun gear 1332, a second carrier 1334 and a second ring gear 1336. The input member 12 couples to the second sun gear 1332 and selectively couples to the first carrier 1324 by activating a second clutch C2 1342. The second carrier 1334 couples to the first ring gear 1326 and selectively couples to the first carrier 1324 by activating a first clutch C1 1341. The second ring gear 1336 couples to the first carrier 1324 by activating a third clutch C3 1343, and selectively grounds to the transmission case 1340 by activating a first brake B1 1344. The output member 14 couples to the first sun gear 1322. In one embodiment, the first brake B1 1344 may be omitted and replaced by permanently coupling the first ring gear 1336 to the transmission case 1340. In an embodiment of the multi-mode transmission 100 employing this embodiment of the fixed-gear-ratio transmission 1350, a clutch activation chart and corresponding gear ratios associated with operation thereof is detailed in Table 12, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 12

|  | Ratios | B1 | C1 | C2 | C3 | Ccvt |
|---|---|---|---|---|---|---|
| Reverse | −2.57 | X |  |  | X |  |
| Neutral | 0 | (X) |  |  |  |  |
| 1 | 3.6 | X | X |  |  |  |
| CVTUD | 2 | X |  |  |  | X |
| CVTOD | 0.5 | X |  |  |  | X |
| 3 | 0.5 | X |  |  | X |  |

Figure 14:
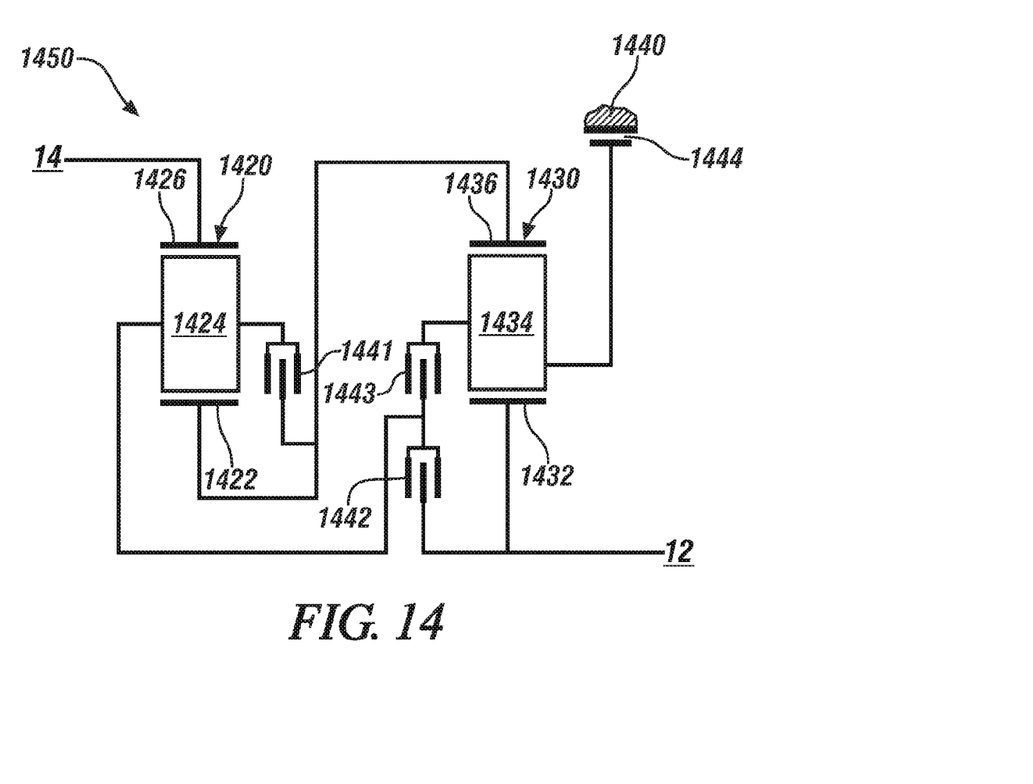

FIG. 14 schematically illustrates another embodiment of the fixed-gear-ratio transmission 1450 that is capable of transferring mechanical power in either of an overdrive (OD) state and an underdrive (UD) state between the transmission input member 12 and the transmission output member 14. In this embodiment, the fixed-gear-ratio transmission 1450 includes a first planetary gear set 1420 and a second planetary gear set 1430. In one embodiment, the first and second planetary gear sets 1420, 1430 are simple planetary gear sets. In one embodiment, the first and second planetary gear sets 1420, 1430 can be stacked. The first planetary gear set 1420 includes a first sun gear 1422, a first carrier 1424 and a first ring gear 1426, and the second planetary gear set 1430 includes a second sun gear 1432, a second carrier 1434 and a second ring gear 1436. The input member 12 couples to the second sun gear 1432, selectively couples to the first carrier 1424 by activating a second clutch C2 1442, and selectively couples to the second carrier 1443 by activating the second clutch C2 1442 and a third clutch C3 1443. The second carrier 1434 selectively grounds to the transmission case 1440 by activating a first brake B1 1444 and selectively couples to the first carrier 1424 by activating the third clutch C3 1434. The second ring gear 1436 couples to the first sun gear 1422 and selectively couples to the first carrier 1424 by activating a first clutch C1 1441. The first ring gear 1426 couples to the output member 14. In one embodiment, the first brake B1 1444 may be omitted and replaced by permanently grounding the second carrier 1434 to the transmission case 1440. In an embodiment of the multi-mode transmission 100 employing this embodiment of the fixed-gear-ratio transmission 1450, a clutch activation chart and corresponding gear ratios associated with operation thereof is detailed in Table 13, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 13

|  | Ratios | B1 | C1 | C2 | C3 | Ccvt |
|---|---|---|---|---|---|---|
| Reverse | −2.6 | X | X |  |  |  |
| Neutral | 0 | (X) |  |  |  |  |
| 1 | 3.64 | X |  |  | X |  |
| CVTUD | 2 | X |  |  |  | X |
| CVTOD | 0.5 | X |  |  |  | X |
| 3 | 0.5 | X |  |  | X |  |

Figure 15:
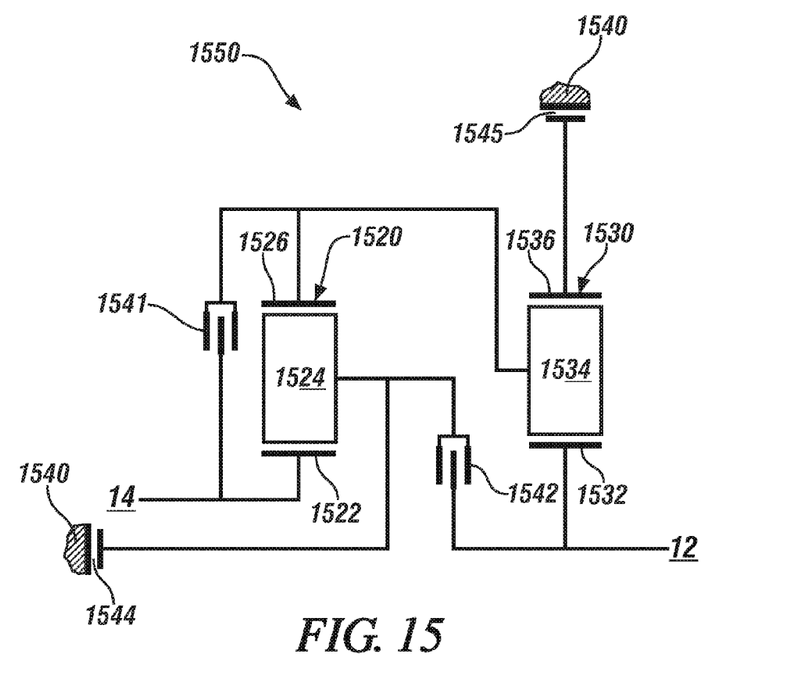

FIG. 15 schematically illustrates another embodiment of the fixed-gear-ratio transmission 1550 that is capable of transferring mechanical power in either of an overdrive (OD) state and an underdrive (UD) state between the transmission input member 12 and the transmission output member 14. In this embodiment, the fixed-gear-ratio transmission 1550 includes a first planetary gear set 1520 and a second planetary gear set 1530. In one embodiment, the first and second planetary gear sets 1520, 1530 are simple planetary gear sets. The first planetary gear set 1520 includes a first sun gear 1522, a first carrier 1524 and a first ring gear 1526, and the second planetary gear set 1530 includes a second sun gear 1532, a second carrier 1534 and a second ring gear 1536. The input member 12 couples to the second sun gear 1532 and selectively couples to the first carrier 1524 by activating a second clutch C2 1542. The second carrier 1534 couples to the first ring gear 1526, and both selectively couple to the output member 14 and the first sun gear 1522 by activating the first clutch C1 1541. The second ring gear 1536 selectively grounds to the transmission case 1540 by activating a second brake B2 1545. The first sun gear 1522 couples to the output member 14. The first carrier 1524 selectively grounds to the transmission case 1540 by activating a first brake B1 1544. In one embodiment, the second brake B2 1545 may be omitted and replaced by permanently grounding the second ring gear 1536 to the transmission case 1540. In an embodiment of the multi-mode transmission 100 employing this embodiment of the fixed-gear-ratio transmission 1550, a clutch activation chart and corresponding gear ratios associated with operation thereof is detailed in Table 14, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 14

|  | Ratios | B1 | B2 | C1 | C2 | Ccvt |
|---|---|---|---|---|---|---|
| Reverse | −2.57 | X | X |  |  |  |
| Neutral | 0 |  | (X) |  |  |  |
| 1 | 3.6 |  | X | X |  |  |

TABLE 14-continued

| | Ratios | B1 | B2 | C1 | C2 | Ccvt |
|---|---|---|---|---|---|---|
| CVTUD | 2 | | X | | | X |
| CVTOD | 0.5 | | X | | | X |
| 3 | 0.5 | | X | X | | |

Figure 16:
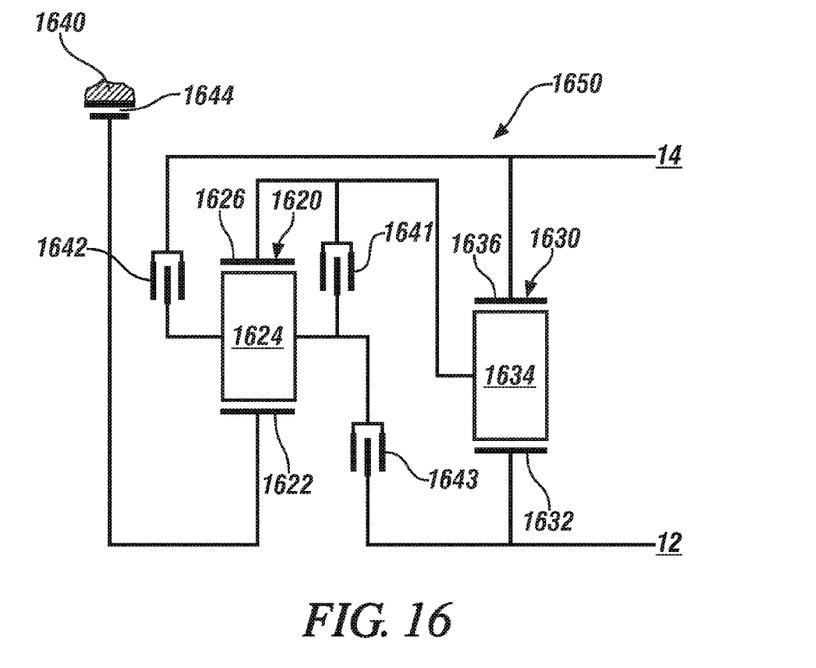

FIG. 16 schematically illustrates another embodiment of the fixed-gear-ratio transmission 1650 that is capable of transferring mechanical power in either of an overdrive (OD) state and an underdrive (UD) state between the transmission input member 12 and the transmission output member 14. In this embodiment, the fixed-gear-ratio transmission 1650 includes a first planetary gear set 1620 and a second planetary gear set 1630. In one embodiment, the first and second planetary gear sets 1620, 1630 are simple planetary gear sets. The first planetary gear set 1620 includes a first sun gear 1622, a first carrier 1624 and a first ring gear 1626, and the second planetary gear set 1630 includes a second sun gear 1632, a second carrier 1634 and a second ring gear 1636. The input member 12 couples to the second sun gear 1632, selectively couples to the first carrier 1624 by activating a third clutch C3 1643. The second carrier 1634 couples to the first ring gear 1626, and selectively couples to the first carrier 1624 by activating a first clutch C1 1641. The second ring gear 1636 couples to the output member 14. The first sun gear 1622 selectively grounds to the transmission case 1640 by activating a first brake B1 1644. The first carrier 1624 selectively couples to the output member 14 and the second ring gear 1636 by activating the second clutch C2 1642. In one embodiment, the first brake B1 1644 may be omitted and replaced by permanently grounding the first sun gear 1622 to the transmission case 1640. In an embodiment of the multi-mode transmission 100 employing this embodiment of the fixed-gear-ratio transmission 1650, a clutch activation chart and corresponding gear ratios associated with operation thereof is detailed in Table 15, wherein the various modes include Reverse, Neutral, CVU underdrive (CVTUD), CVU overdrive (CVTOD), first fixed-gear-ratio which is underdrive (1) and second fixed-gear-ratio which is overdrive (3), as follows.

TABLE 15

| | Ratios | B1 | C1 | C2 | C3 | Ccvt |
|---|---|---|---|---|---|---|
| Reverse | −2.6 | X | X | | | |
| Neutral | 0 | (X) | | | | |
| 1 | 3.57 | X | | X | | |
| CVTUD | 2 | X | | | | X |
| CVTOD | 0.5 | X | | | | X |
| 3 | 0.5 | X | | | X | |

The gains in transmission efficiency associated with the system described herein are manifested in terms of reduced pumping losses, reduced spin losses, reduced CVU belt losses and reduced final drive torque losses when operating in the fixed-gear-ratio mode in either the underdrive state or the overdrive state. Such a configuration facilitates combining CVU operation and fixed UD and OD gears for improved powertrain efficiency during highway driving and city driving (including stop-start driving), and permits reduced CVU size and ratio configurations.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A torque transmission device for a powertrain system, comprising:
    a continuously variable unit (CVU) arranged in parallel with a fixed-gear-ratio transmission to transfer torque between a transmission input member and a transmission output member;
    the transmission input member selectively rotatably coupled to an input member of the CVU by activating a CVU input clutch;
    the transmission output member rotatably coupled to a CVU output member;
    the fixed-gear-ratio transmission including first and second planetary gear sets arranged to transfer torque between the transmission input member and the transmission output member in fixed-gear-ratio modes by selectively activating a plurality of transmission clutches;
    the first and second planetary gear sets each including a plurality of meshingly engaged gear members including a ring gear, a plurality of planet gears coupled to a carrier and a sun gear, wherein each of the gear members represents a node;
    the transmission input member fixedly rotatably coupled to one of the nodes of the first planetary gear set and selectively rotatably coupled to one of the nodes of the second planetary gear set;
    the transmission output member rotatably coupled to another of the nodes of either the first planetary gear set or the second planetary gear set;
    the torque transmission device transferring torque in a continuously variable mode when the CVU input clutch and a single one of the plurality of transmission clutches are activated;
    the torque transmission device transferring torque in a first of the fixed-gear-ratio modes including a fixed underdrive input/output speed ratio when the CVU input clutch is deactivated and a first set of two of the transmission clutches is activated; and
    the torque transmission device transferring torque in a second of the fixed-gear-ratio modes including a fixed overdrive input/output speed ratio when the CVU input clutch is deactivated and a second set of two of the transmission clutches is activated.

2. The torque transmission device of claim 1, wherein one of the nodes of the first planetary gear set rotatably couples to one of the nodes of the second planetary gear when the torque transmission device operates in the first fixed-gear-ratio mode and when the torque transmission device operates in the second fixed-gear-ratio mode.

3. The torque transmission device of claim 1, further comprising the torque transmission device operating in a reverse mode including a fixed input/output speed ratio when the CVU input clutch is deactivated and a third set of two of the transmission clutches is activated.

4. The torque transmission device of claim 1, wherein the transmission output member rotatably coupled to another of the nodes of the second planetary gear set comprises the transmission output member continuously rotatably coupled to another of the nodes of the second planetary gear set.

5. The torque transmission device of claim 1, wherein the transmission output member rotatably coupled to another of the nodes of the second planetary gear set comprises the transmission output member selectively rotatably coupled to another of the nodes of the second planetary gear set by activating one of the clutches.

6. The torque transmission device of claim 1, further comprising the torque transmission device in a neutral state when all the transmission clutches and the CVU clutch are deactivated.

7. The torque transmission device of claim 1, further comprising the torque transmission device in a neutral state when all but one of the transmission clutches and the CVU clutch are deactivated.

8. The torque transmission device of claim 1, wherein the transmission input member rotatably coupled to one of the nodes of the first planetary gear set comprises the transmission input member fixedly rotatably coupled to one of the nodes of the first planetary gear set.

9. The torque transmission device of claim 1, wherein the transmission input member rotatably coupled to one of the nodes of the first planetary gear set comprises the transmission input member selectively rotatably coupled to one of the nodes of the first planetary gear set by activating a clutch.

10. The torque transmission device of claim 1, wherein the transmission input member rotatably coupled to one of the nodes of the first planetary gear set and one of the nodes of the second planetary gear set comprises the transmission input member continuously rotatably coupled to one of the nodes of the first planetary gear set and selectively rotatably coupled to one of the nodes of the second planetary gear set by activating one of the transmission clutches.

11. The torque transmission device of claim 1, wherein the transmission input member rotatably coupled to one of the nodes of the first planetary gear set and one of the nodes of the second planetary gear set comprises the transmission input member selectively rotatably coupled to one of the nodes of the first planetary gear set by activating one of the transmission clutches and continuously rotatably coupled to one of the nodes of the second planetary gear set.

12. The torque transmission device of claim 1, wherein the plurality of transmission clutches includes at least one selectively activatable torque transfer device for rotatably coupling coaxial nodes of the first and second planetary gear sets and at least one selectively activatable torque transfer device for grounding rotation of one of the nodes to a non-rotating element.

13. The torque transmission device of claim 12, further comprising one of the at least one of the selectively activatable torque transfer devices for grounding rotation of one of the nodes to a non-rotating element replaced with a direct connection to the non-rotating element.

14. The torque transmission device of claim 1, wherein the torque transmission device transferring torque in a continuously variable mode when the CVU input clutch and a single one of the plurality of transmission clutches are activated comprises the torque transmission device operating in a continuously variable mode within a range between a minimum CVU underdrive ratio and a maximum CVU overdrive ratio.

15. The torque transmission device of claim 14, wherein the maximum CVU overdrive ratio is equivalent to the fixed overdrive input/output speed ratio when the CVU input clutch is deactivated and a second set of two of the transmission clutches is activated to operate the torque transmission device operating in the second of the fixed-gear-ratio modes.

16. The torque transmission device of claim 1, further comprising the first and second planetary gear sets configured in a stacked gear arrangement to achieve the plurality of meshingly engaged gear members including a ring gear, a plurality of planet gears coupled to a carrier and a sun gear, wherein each of the gear members represents a node.

17. A torque transmission device for a powertrain system, comprising:
a variator unit for a continuously variable unit (CVU) arranged in parallel with a fixed-gear-ratio transmission to transfer torque between a transmission input member and a transmission output member;
the transmission input member selectively rotatably coupled to an input member of the CVU by activating a CVU input clutch;
the transmission output member rotatably coupled to a CVU output member;
the fixed-gear-ratio transmission including first and second planetary gear sets arranged to transfer torque between the transmission input member and the transmission output member in fixed-gear-ratio modes by selectively activating a plurality of transmission clutches;
the first and second planetary gear sets each including a plurality of meshingly engaged gear members including a ring gear, a plurality of planet gears coupled to a carrier and a sun gear, wherein each of the gear members represents a node;
the transmission input member rotatably coupled to one of the nodes of the first planetary gear set and one of the nodes of the second planetary gear set;
the transmission output member rotatably coupled to another of the nodes of either the first planetary gear set or the second planetary gear set;
wherein one of the nodes of the first and second planet gear sets is grounded to a transmission case;
the torque transmission device transferring torque in a continuously variable mode when the CVU input clutch is activated;
the torque transmission device transferring torque in a first of the fixed-gear-ratio modes including a fixed overdrive input/output speed ratio when the CVU input clutch is deactivated and a first one of the transmission clutches is activated; and
the torque transmission device transferring torque in a second of the fixed-gear-ratio modes including a fixed underdrive input/output speed ratio when the CVU input clutch is deactivated and a second one of the transmission clutches is activated.

18. A torque transmission device for a powertrain system, comprising:
a continuously variable unit (CVU) arranged in parallel with a fixed-gear-ratio transmission to transfer torque between a transmission input member and a transmission output member;
the transmission input member selectively rotatably coupled to an input member of the CVU by activating a CVU input clutch;
the transmission output member rotatably coupled to a CVU output member;
the fixed-gear-ratio transmission including first and second planetary gear sets arranged to transfer torque between the transmission input member and the transmission output member in fixed-gear-ratio modes by selectively activating a plurality of transmission clutches;
the first and second planetary gear sets each including a plurality of meshingly engaged gear members including a ring gear, a plurality of planet gears coupled to a carrier and a sun gear, wherein each of the gear members represents a node;

the transmission input member fixedly rotatably coupled to one of the nodes of the second planetary gear set and selectively rotatably coupled to one of the nodes of the first planetary gear set;

the transmission output member rotatably coupled to another of the nodes of either the first planetary gear set or the second planetary gear set;

the torque transmission device transferring torque in a continuously variable mode when the CVU input clutch and a single one of the plurality of transmission clutches are activated;

the torque transmission device transferring torque in a first of the fixed-gear-ratio modes including a fixed underdrive input/output speed ratio when the CVU input clutch is deactivated and a first set of two of the transmission clutches is activated; and the torque transmission device transferring torque in a second of the fixed-gear-ratio modes including a fixed overdrive input/output speed ratio when the CVU input clutch is deactivated and a second set of two of the transmission clutches is activated.

* * * * *